(12) United States Patent
Jo et al.

(10) Patent No.: US 8,811,318 B2
(45) Date of Patent: Aug. 19, 2014

(54) METHOD FOR PROCESSING TRAFFIC IN UNUSED BAND IN AN INTERMEDIATE ACCESS POINT

(75) Inventors: Jun Ho Jo, Anyang-si (KR); Jae Won Lim, Anyang-si (KR); Ji Hyun Lee, Anyang-si (KR); Se Yeong Choi, Anyang-si (KR); Seo Woo Jang, Anyang-si (KR); Soon Joon Park, Anyang-si (KR); Byoung Hoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 269 days.

(21) Appl. No.: 13/264,985

(22) PCT Filed: Apr. 16, 2010

(86) PCT No.: PCT/KR2010/002383
§ 371 (c)(1),
(2), (4) Date: Mar. 9, 2012

(87) PCT Pub. No.: WO2010/120149
PCT Pub. Date: Oct. 21, 2010

(65) Prior Publication Data
US 2012/0163179 A1 Jun. 28, 2012

Related U.S. Application Data

(60) Provisional application No. 61/293,709, filed on Jan. 11, 2010, provisional application No. 61/169,729, filed on Apr. 16, 2009.

(30) Foreign Application Priority Data

Jul. 28, 2009 (WO) ................ PCT/KR2009/004185
Apr. 5, 2010 (KR) ........................ 10-2010-0030878

(51) Int. Cl.
*H04W 28/10* (2009.01)

(52) U.S. Cl.
USPC ........................................................ 370/329

(58) Field of Classification Search
CPC .............................. H04W 28/02; H04W 29/02
See application file for complete search history.

(56) References Cited

U.S. PATENT DOCUMENTS

| | | | |
|---|---|---|---|
| 2005/0237973 A1 | 10/2005 | Takeda et al. | |
| 2008/0045204 A1* | 2/2008 | Takano et al. | 455/422.1 |
| 2008/0056125 A1 | 3/2008 | Kneckt et al. | |
| 2008/0107075 A1 | 5/2008 | Ramachandran et al. | |
| 2008/0181318 A1 | 7/2008 | Kim et al. | |
| 2008/0225829 A1 | 9/2008 | Sachs et al. | |
| 2011/0189944 A1* | 8/2011 | Wang et al. | 455/7 |
| 2012/0184222 A1* | 7/2012 | Seok | 455/67.11 |

FOREIGN PATENT DOCUMENTS

KR   1020090015543   2/2009

* cited by examiner

*Primary Examiner* — Huy D Vu
*Assistant Examiner* — Teisha D Hall
(74) *Attorney, Agent, or Firm* — Lee, Hong, Degerman, Kang & Waimey

(57) ABSTRACT

A method for efficiently processing traffic in an intermediate access point such as a relay station is disclosed. To process traffic directed from one or more terminals to a base station, an intermediate access point supporting two or more communication scheme receives traffic from the one or more terminals according to a first communication scheme, measures a congestion level of the received traffic, transmits a first traffic being part of the received traffic to a second intermediate access point according to a second communication scheme, if the congestion level is equal to or higher than a predetermined threshold, and transmits a second traffic being remaining traffic of the received traffic except the first traffic to the BS.

16 Claims, 18 Drawing Sheets

METHOD FOR PROCESSING TRAFFIC IN UNUSED BAND IN AN INTERMEDIATE ACCESS POINT

CROSS-REFERENCE TO RELATED APPLICATIONS

This application is the National Stage filing under 35 U.S.C. 371 of International Application No. PCT/KR2010/002383, filed on Apr. 16, 2010, which claims the benefit of earlier filing date and right of priority to Korean Application No. 10-2010-0030878, filed on Apr. 5, 2010, and International Application No. PCT/KR2009/004185, filed on Jul. 28, 2009, and also claims the benefit of U.S. Provisional Application Ser. Nos. 61/293,709, filed on Jan. 11, 2010 and 61/169,729, filed on Apr. 16, 2009, the contents of all of which are incorporated by reference herein in their entirety.

BACKGROUND OF THE INVENTION

1. Field of the Invention

The present invention relates to a method for efficiently processing traffic in an intermediate access point such as a Relay Station (RS).

2. Discussion of the Related Art

Discussion about adding an intermediate access point between a Base Station (BS) and a terminal is underway in mobile communication systems. Intermediate access points may include an RS, a femto station (or a femtocell BS), a pico station (or a picocell BS), etc. The following description is made with the appreciation that the intermediate access point is an RS, by way of example.

FIG. 1 conceptually illustrates the configuration of a communication system using RSs.

Referring to FIG. 1, a BS 100 is connected to a plurality of RSs 110a to 110d by cable and the RSs 110a to 110d provide communication services to terminals 120a to 120h within their coverage areas. For example, the RS 110a may relay a signal received from the terminal 120a to the BS 100 and a signal received from the BS 100 to the terminal 120a.

As described above, an intermediate access point such as an RS, interposed between a BS and a terminal receives a signal from the BS or the terminal, amplifies or actively processes the received signal, and transmits the amplified or actively processed signal to the terminal or the BS, thereby extending communication service coverage. Also, the intermediate access point enhances throughput by improving communication services between the BS and the terminal.

Under circumstances, traffic between terminals and the BS may be congested at a particular intermediate access point. In this case, there exists a need for developing a method for efficiently processing traffic.

SUMMARY OF THE INVENTION

Accordingly, the present invention is directed to a method for processing traffic using an unused band in an intermediate access point that substantially obviates one or more problems due to limitations and disadvantages of the related art.

An object of the present invention is to provide a method for efficiently processing traffic, when traffic between a BS and terminals are congested at a particular intermediate access point, and an intermediate access point apparatus for the same.

Another object of the present invention is to provide a method for efficiently distributing traffic congested at a specific intermediate access point, using an unused frequency band.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for processing traffic directed from one or more terminals to a BS received from in a first intermediate access point supporting two or more communication schemes, includes receiving traffic from the one or more terminals according to a first communication scheme, measuring a congestion level of the received traffic, transmitting a first traffic being part of the received traffic to a second intermediate access point according to a second communication scheme, if the congestion level is equal to or higher than a predetermined threshold, and transmitting a second traffic being remaining traffic of the received traffic except the first traffic to the BS. The second communication scheme is a communication scheme using a frequency band unused for another communication system. The frequency band unused for another communication system may include a TV White Space (TVWS).

The method may further include acquiring information about neighbor intermediate access points available in the TVWS from a TVWS database, and selecting the second intermediate access point based on the acquired information. The selection of the second intermediate access point may include transmitting, to the neighbor intermediate access points according to the acquired information, a request message including an available channel list that is a list of channels available to the first intermediate access point according to the second communication scheme, receiving response messages for each channel included in the available channel list from the neighbor intermediate access points, and selecting the second intermediate access point from among the neighbor intermediate access points based on the response messages.

The method may further include monitoring a control channel in the TVWS and transmitting a random access preamble to the second intermediate access point after a predetermined backoff time, receiving a response message for the random access preamble from the second intermediate access point, and establishing a connection with the second intermediate access point according to the response message. The predetermined backoff time may be determined according to a traffic congestion level of the first intermediate access point.

The second communication scheme may be a Wireless Local Area Network (WLAN) communication scheme. The first and second communication schemes may be independent of each other.

In another aspect of the present invention, a first intermediate access point supporting two or more communication schemes includes a first communication module for receiving traffic from one or more terminals according to a first communication scheme, a second communication module for transmitting traffic to a second intermediate access point according to a second communication scheme, a third communication module for transmitting traffic to a BS according to a third communication scheme, and a processor for measuring a congestion level of the traffic received at the first communication module, transmitting a first traffic being part of the traffic received at the first communication module to the second intermediate access point through the second communication module, if the congestion level is equal to or higher than a predetermined threshold, and transmitting a second traffic being remaining traffic of the traffic received at the first communication module except the first traffic to the BS. The second communication scheme is a communication scheme using a frequency band unused for another communication system. The frequency band unused for another communication system may include a TVWS.

The processor may be adapted to acquire information about neighbor intermediate access points available in the TVWS from a TVWS database and to select the second intermediate access point based on the acquired information. In this case, the processor may be adapted to transmit, to the neighbor intermediate access points according to the acquired information, a request message including an available channel list that is a list of channels available to the second communication module, to receive response messages for each channel included in the available channel list from the neighbor intermediate access points, and to select the second intermediate access point from among the neighbor intermediate access points based on the response messages.

The processor may be adapted to monitor a control channel in the TVWS and transmit a random access preamble to the second intermediate access point after a predetermined backoff time, to receive a response message for the random access preamble from the second intermediate access point, and to establish a connection with the second intermediate access point according to the response message. The predetermined backoff time may be determined according to a traffic congestion level of the first intermediate access point.

The first communication module may include a cellular communication module and the second communication module may include a WLAN communication scheme.

The first intermediate access point may include a relay station and the third communication module may include a wired communication module using a wired network connected between the relay station and the BS.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

In the following description, the term "terminal" generically refers to a mobile or fixed user terminal device such as a User Equipment (UE), a Mobile Station (MS), etc. Intermediate access points may include a Relay Station (RS), a femtocell Base Station (BS), a picocell BS, a Home Node B (HNB), an enhanced HNB (eHNB), etc.

An embodiment of the present invention is intended to provide a method for efficiently processing traffic, when traffic between a BS and terminals is congested at a particular intermediate access point. Before describing the embodiment of the present invention, a detailed description will first be made of an RS under discussion as an example of an intermediate access point added between a BS and a terminal in Institute of Electrical and Electronics Engineers (IEEE) 802.16. Notably, the same description of an RS considered in IEEE 802.16j may be applicable to an RS under consideration in 3$^{rd}$ Generation Partnership Project International Mobile Telecommunications-Advanced (3GPP IMT-Advanced, e.g. Long Term Evolution-Advanced (LTE-A)). Also, the following description of an RS is applicable to other types of intermediate access points.

In 2006, IEEE 802.16 was working on a new project of standardizing multi-hop relay, after publishing a standard for fixed subscriber stations, IEEE 802.16-2004 and a standard for providing mobility to subscriber stations, IEEE 802.16e-2005. Task Group j of IEEE 802.16 also called IEEE 802.16TGj, which takes charge of this project, started to seriously discuss usage models, terminology, and technical requirements in the second meeting on July, 2006 after the first official meeting on May, 2006. Hereinbelow, IEEE 802.16j is short for IEEE 802.16TGj.

Figure 1:
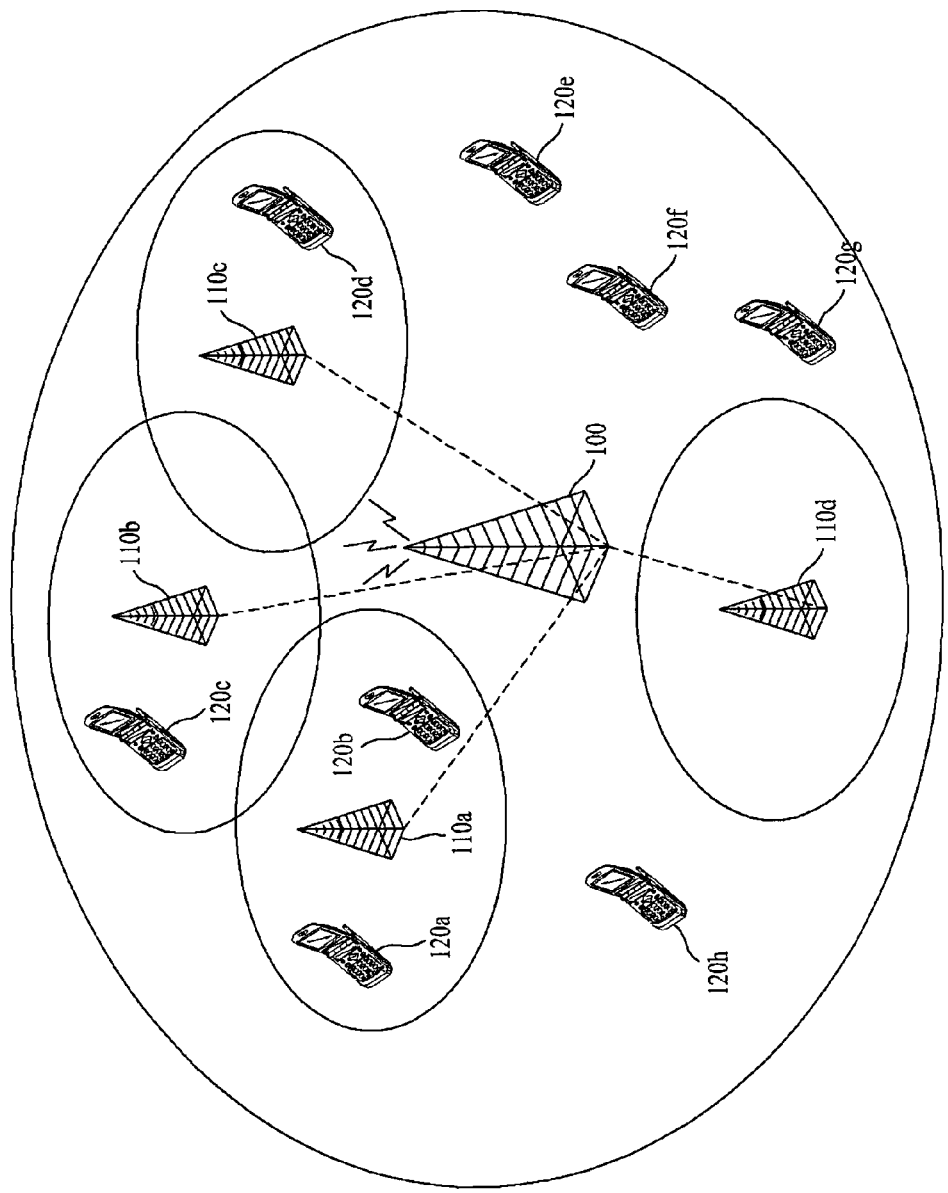
FIG. 1 conceptually illustrates the configuration of a communication system using Relay Stations (RSs).
Figure 2:
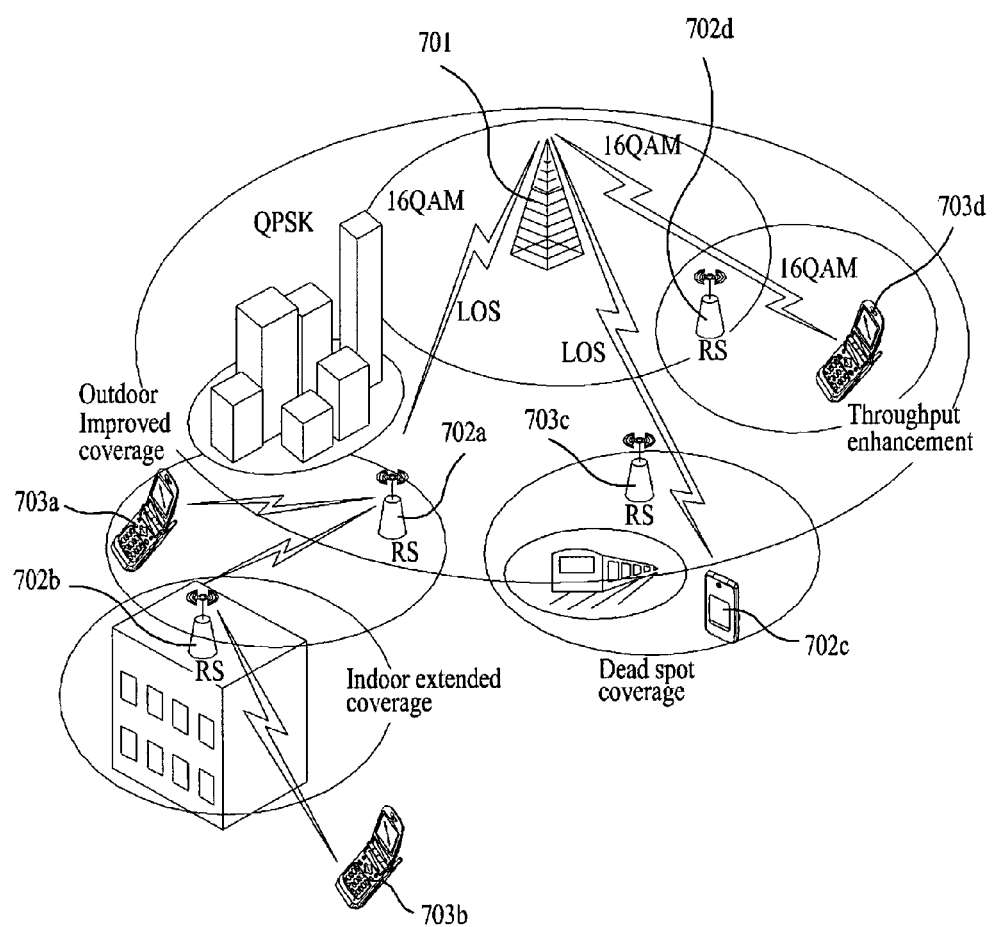
FIG. 2 is a schematic view illustrating a function of an RS to which an embodiment of the present invention is applicable.

The following two goals are clarified for a standardization task under IEEE 802.16j Project Authorization Request (PAR).
(1) Coverage extension
(2) Throughput enhancement FIG. 2 is a schematic view illustrating a function of an RS to which an embodiment of the present invention is applicable. Referring to FIG. 2, reference numeral 701 denotes a BS, reference numerals 702a to 702d denote RSs, and reference numerals 703a to 703d denote terminals. As illustrated in FIG. 2, terminals can communicate with the BS 701 even outside the coverage area of the BS 701 or in a shadowing area, via the RSs 702a, 702b and 702c. To be more specific, the outdoor coverage of the BS 701 is extended through the RS 702a, the indoor coverage of the BS 701 is extended through the RS 702b, and the BS 701 can provide communication services through the RS 702c even to a shadowing area where communication services are blocked due to a high-speed railway or the like.

Further, because a high-quality path to which a high-order Adaptive Modulation and Coding (AMC) is applicable can be established with the terminal 703d within the coverage area of the BS 701 through the RS 702d, system capacity can be increased with the same amount of radio resources.

Figure 3:
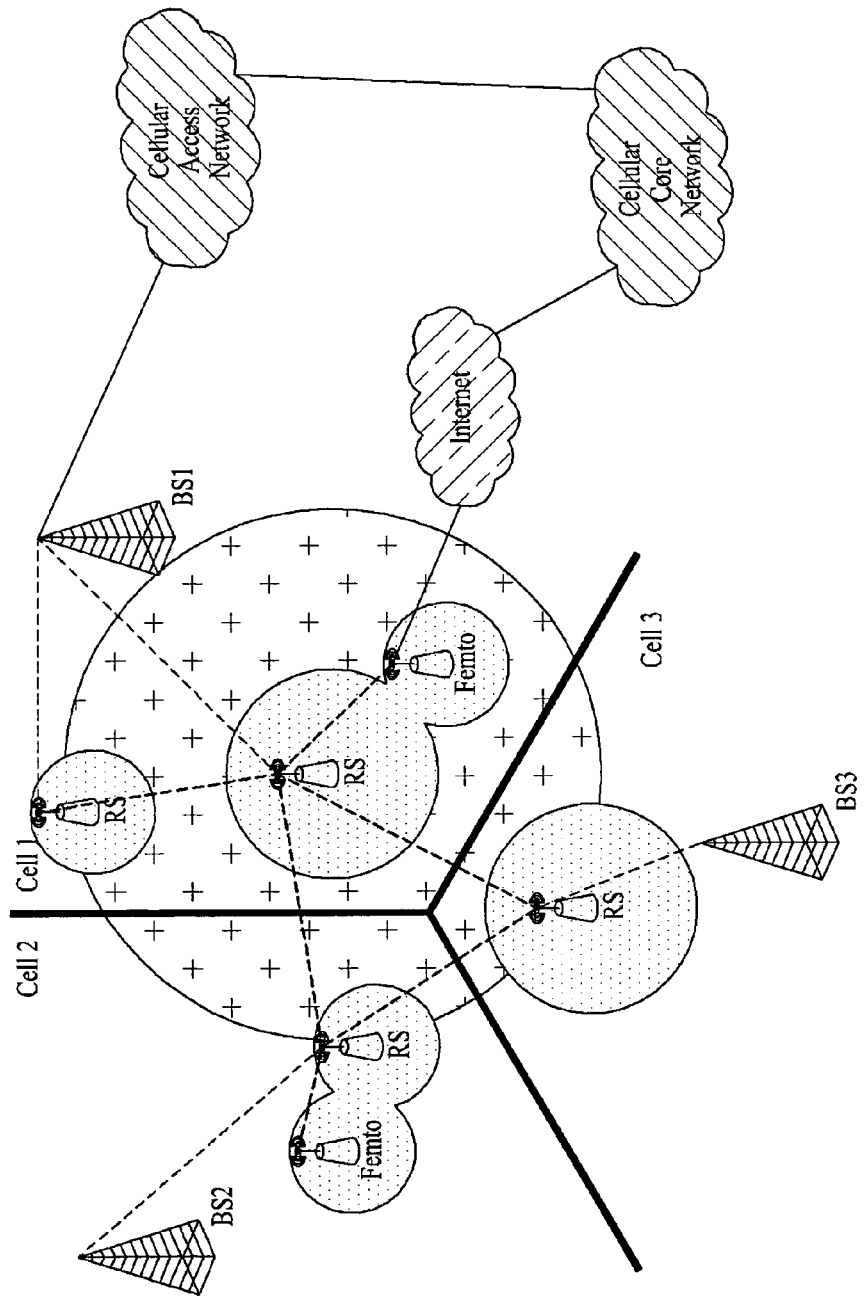
FIG. 3 illustrates a communication system including various nodes that may function as intermediate access points for communication between a Base Station (BS) and a terminal.

As described above, besides an RS, a node that can serve as an intermediate access point between a BS and a terminal may be a femto station (or a femtocell BS), a pico station (or a picocell BS), etc. FIG. 3 illustrates a communication system in which such various intermediate access points are deployed. As illustrated in FIG. 3, femtocell BSs may be connected to a cellular core network over the Internet. While the following description is centered on an RS as an intermediate access point, the present invention is not limited to the RS.

Figure 4:
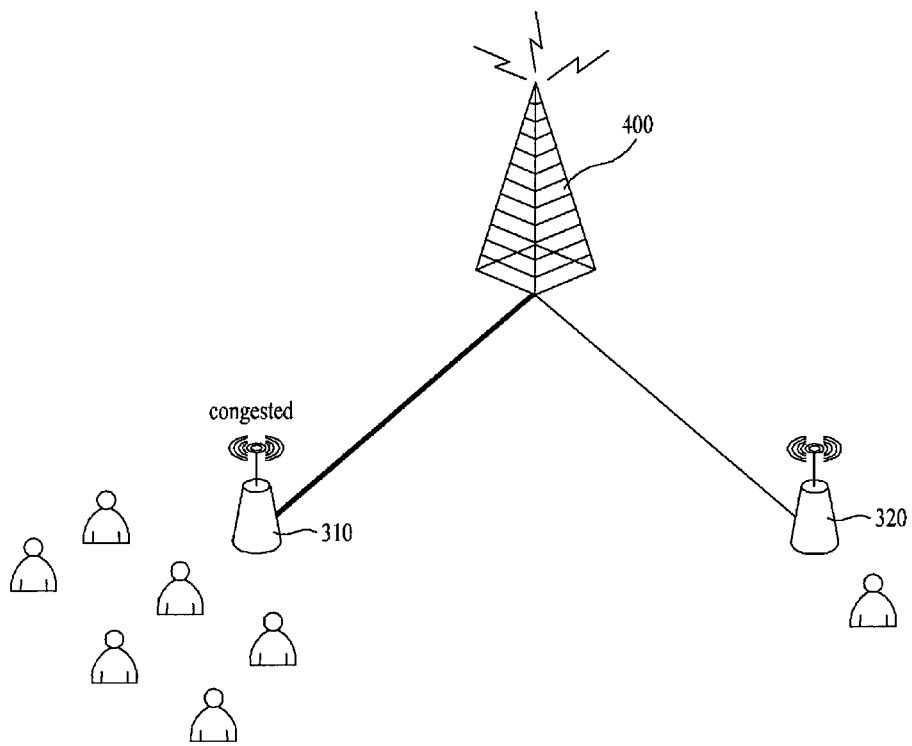
FIG. 4 illustrates a case of traffic congestion at a particular RS.

Meanwhile, it may occur that traffic is congested at a certain RS. FIG. 4 illustrates a case of traffic congestion at a particular RS.

Referring to FIG. 4, when traffic is congested at a particular RS 310, there may be problems with processing traffic sensitive to delay or jitter. The present invention is based on the property that a neighbor RS 320 may have extra capacity for processing traffic in case of traffic congestion at the RS 310. That is, part of the traffic congested at the RS 310 is transmitted to the neighbor RS 320 in an independent communication scheme to thereby prevent delay- or jitter-caused performance degradation in an embodiment of the present invention.

Figure 5:
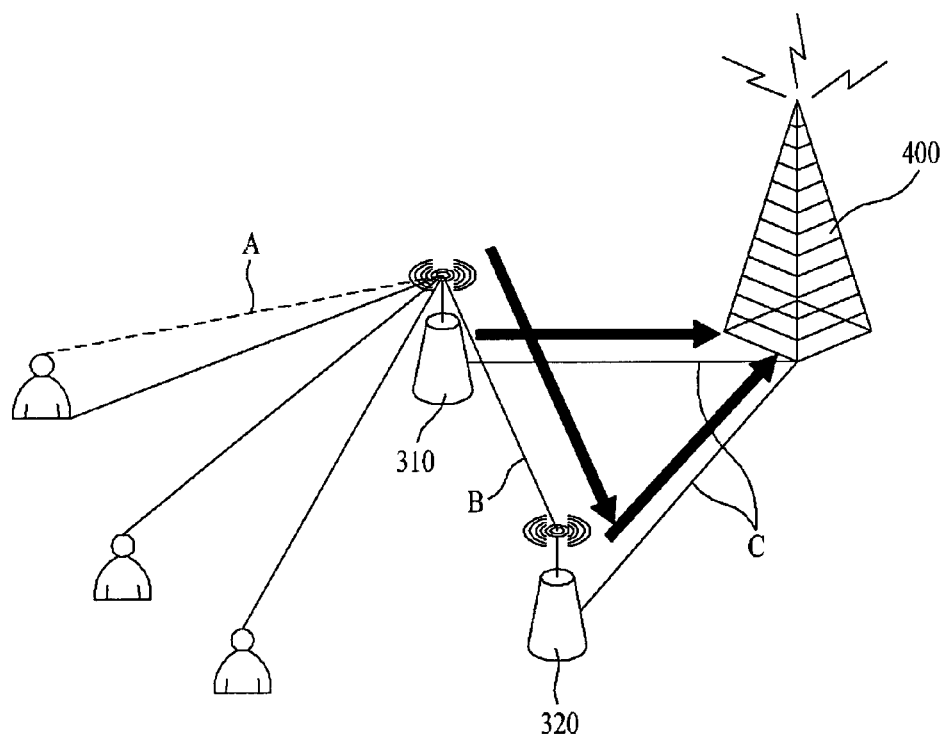
FIG. 5 illustrates the concept of distributing and processing traffic to a neighbor intermediate access point, when user traffic is congested at a particular intermediate access point according to an embodiment of the present invention.

FIG. 5 illustrates the concept of distributing and processing traffic to a neighbor intermediate access point, when user traffic is congested at a particular intermediate access point according to an embodiment of the present invention. Referring to FIG. 5, when an intermediate access point, for example, the RS 310 receives traffic from a terminal in a first communication scheme A and relays the traffic to a BS 400, traffic may be congested at the RS 310, thus causing delay and jitter, as described above. In this context, the RS 310 measures the level of the traffic congestion and if the traffic congestion level is a predetermined value or higher, it transmits part of the user traffic to the neighbor RS 320 in a second communication scheme B so that the neighbor RS 320 may transmit the received traffic to the BS 400 in accordance with the embodiment of the present invention. Preferably, the first and second communication schemes A and B are different schemes independent of each other. The embodiment of the present invention is implemented on the assumption that RSs are Wireless Local Area Network (WLAN)-enabled and is implemented such that the RS 310 transmits part of user traffic received according to a cellular communication scheme to the neighbor RS 320 according to a WLAN communication scheme, and the neighbor RS 320 transmits the received traffic to the BS 400 via a wired connection C. In the mean time, the RS 310 may transmit traffic received from users other than the traffic transmitted to the neighbor RS 320 to the BS 400 via a wired connection C established with the BS 400.

In accordance with a preferred embodiment of the present invention, traffic is distributed between intermediate access points using an unused frequency band. The unused frequency band may be fixed or time-variant. The unused frequency band may also be a frequency band actively configured using the Cognitive Radio (CR) technology, which will be described below.

Figure 6:
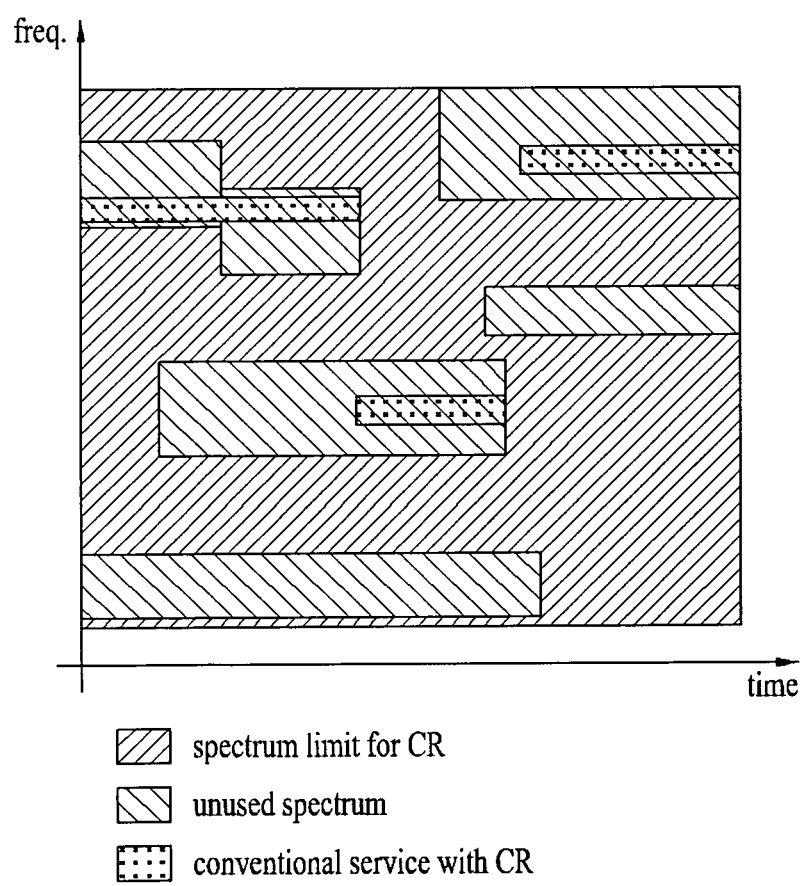
FIG. 6 illustrates a Cognitive Radio (CR)-based service scheme.

FIG. 6 illustrates a Cognitive Radio (CR)-based service scheme.

Basically, CR does not specify a particular technique. CR is a paradigm for wireless communications in which the configuration of a terminal is changed according to spectrum resources for the purpose of efficient utilization of current spectrum resources. FIG. 6 illustrates how a CR terminal makes an access when there is an unused portion of a spectrum. When there is a spectrum band to be monitored and an unused area is sensed from the spectrum band, a communication service to be implemented with CR is provided in the unused area. The communication service may be a fixed- or scalable-band service. The communication service with CR differs from a conventional service in that due to changes in spectrum over time, the former needs a protocol and learning process to manage the spectral changes. The current standard for CR implementation is IEEE 802.22 Wireless Regional Area Network (WRAN).

In this context, CR can be defined as a technology in which a device senses an external radio environment, determines communication parameters optimized for the radio environment on its own, and transmits and receives radio signals without interfering with other devices. In general, personal short-range radio devices operate in unlicensed frequency bands in most countries. However, frequency bands available without license are limited and the rest of frequency bands are mostly allocated for other usages. Therefore, it is very difficult to secure a frequency band in which a new service is launched. Nonetheless, the situation is rather different when one investigates actual spectrum use. Many frequency bands over 2 GHz are not actually in use and there are also frequency bands unused in time and space among major frequency bands below 1 GHz allocated for TV or mobile communication. The Federal Communications Commission (FCC) surveyed an average frequency use rate that varies temporally or locally in a research on an actual frequency use rate. The survey says that there is about 15 to 85% of use rate. Hence the FCC announced a Notice of Proposed Rule Making (NPRM) to raise frequency use efficiency, referring to the availability of overlapping frequency use. This announcement has served a momentum to mitigate frequency shortage.

Since the comment on the possibility of CR-based frequency sharing in the FCC NPRM, the IEEE 802.22 working group has made efforts to develop CR communication systems. The IEEE 802.22 working group is discussing standardization of CR-based WRAN in TV bands, as illustrated in FIG. 7.

Figure 7:
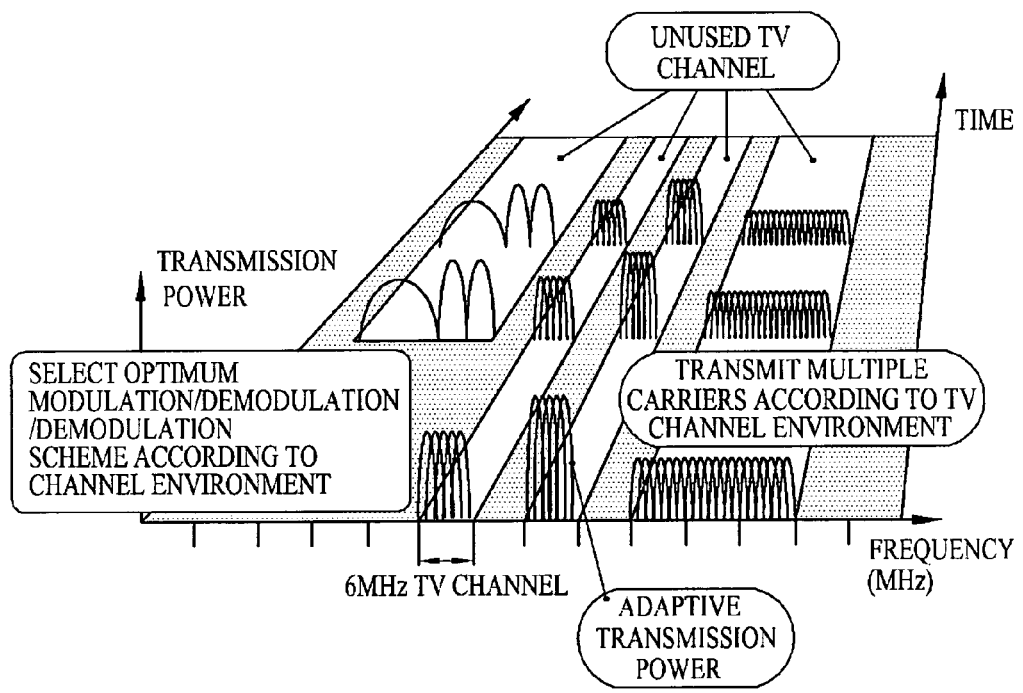
FIG. 7 illustrates the concept of CR sharing for TV spectrum.

FIG. 7 illustrates the concept of CR sharing for TV spectrum. Referring to FIG. 7, IEEE 802.22 provides WRAN services by sharing TV bands. A service unit is determined as an integral multiple of an available TV channel (6 MHz TV channel in FIG. 7). If there is an unused TV channel indicated as 'unused TV channel' in FIG. 7, recognized by a BS, this channel is available for a WRAN service. If consecutive TV channels are available within a range defined in the standard, these channels are grouped for use as a single band and a service is provided over the whole band. FIG. 7 illustrates a case where multiple carriers are transmitted according to an unused TV channel environment, by way of example. A terminal should cognize the whole channel status and enhance its reception capability as well.

The afore-mentioned unused TV channels are presented for illustrative purposes. So-called TV White Spaces (TVWSs) may vary with countries and regions. It is assumed that an intermediate access point can use a TVWS-based communication scheme according to an embodiment of the present invention.

Figure 8:
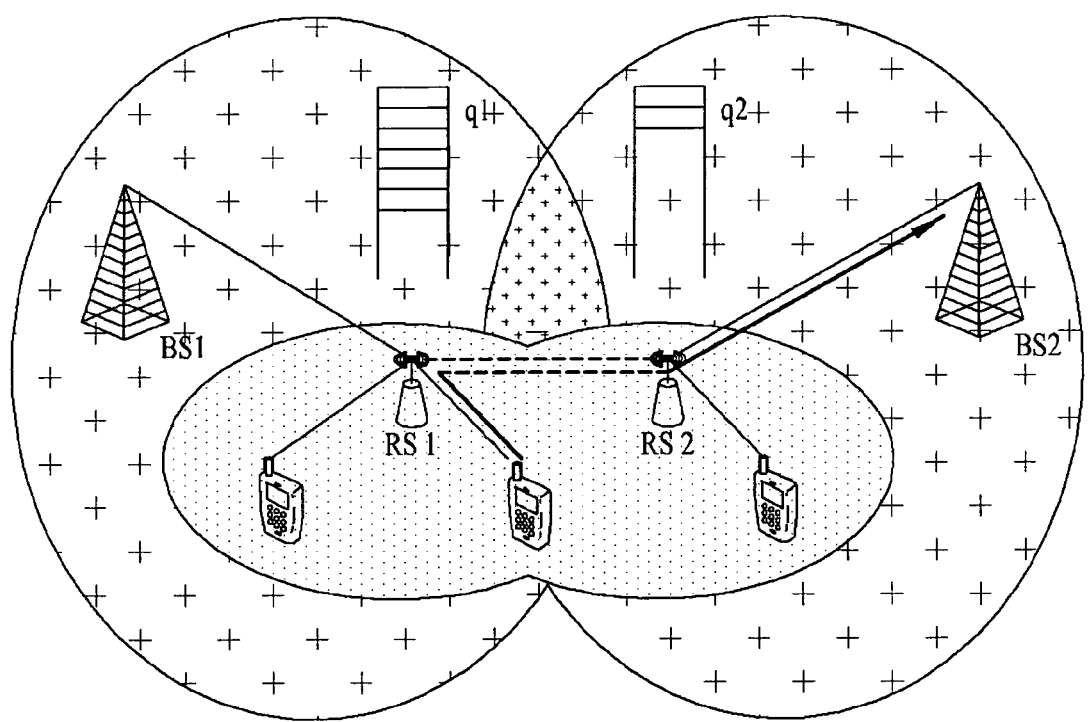
FIG. 8 illustrates an operation method of an intermediate access point according to an embodiment of the present invention.

FIG. 8 illustrates an operation method of an intermediate access point according to an embodiment of the present invention.

It is assumed that an intermediate access point supports a TVWS-based communication scheme according to an embodiment of the present invention. For example, the intermediate access point is equipped with two or more communication modules, one module supporting the TVWS-based communication scheme and the other module supporting a conventional cellular communication scheme, a WLAN communication scheme, or both. The illustrated case of FIG. 8, first and second RSs, RS1 and RS2 are located within the communication coverage of a TVWS band.

When RS1 suffers from a traffic load at or above a predetermined level, RS1 transmits all of part of the traffic to RS2 in the TVWS band and RS2 transmits the received traffic to its serving BS (BS2). In this manner, the traffic can be efficiently distributed, while minimizing interference with conventional cellular communication.

In accordance with the present invention, as far as a specific intermediate access point (e.g. RS1) does not affect on-going communications, the specific intermediate access point may transmit traffic to another intermediate access point (e.g. RS2) in various manners. Hereinbelow, a description will be made of (1) a method for distributing traffic in a general WLAN band using a WLAN communication scheme, (2) a method for distributing traffic using a (WLAN) control channel in a TVWS band, and (3) a method for establishing a link using a TVWS database and distributing traffic via the link.

Embodiment 1: Using WLAN Communication Scheme in General WLAN Band

Traffic distribution using a WLAN communication scheme will be described below. While the following description is made in the context of an intermediate access point being a WLAN-enabled RS, it is to be clearly understood that the intermediate access point may be any wired/wireless small BS such as a femtocell BS.

Figure 9:
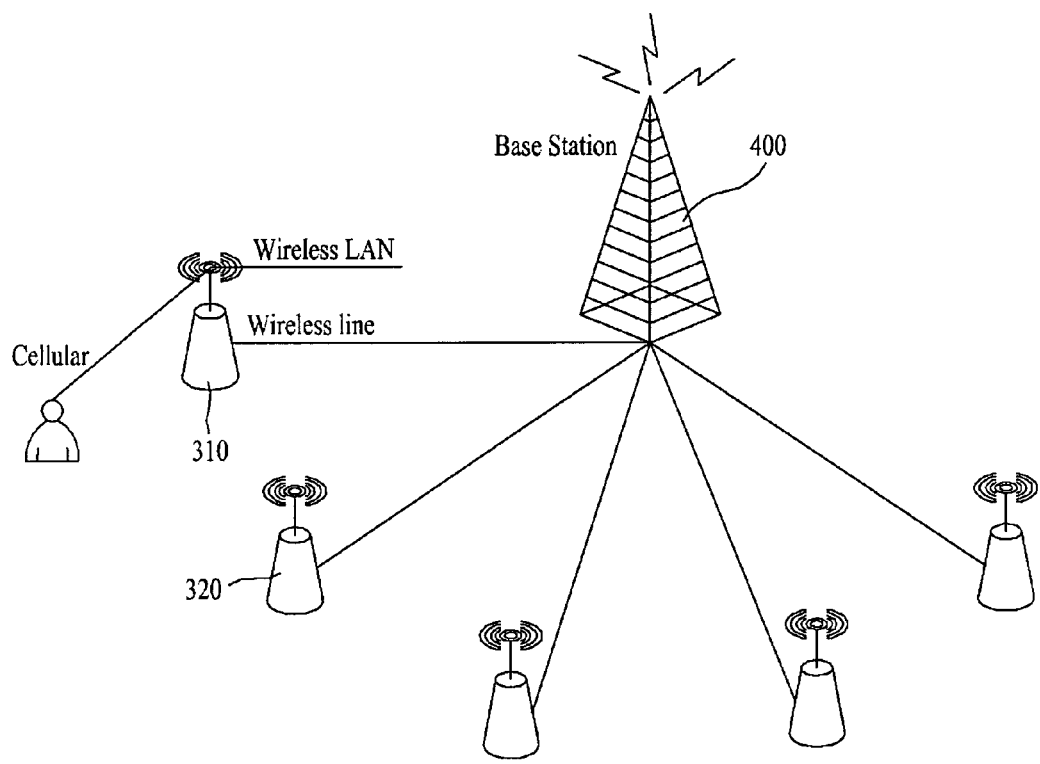
FIGS. 9 and 10 illustrate a method for processing traffic in a distributed manner using Wireless Local Area Network (WLAN)-enabled RSs according to an embodiment of the present invention.
Figure 10:
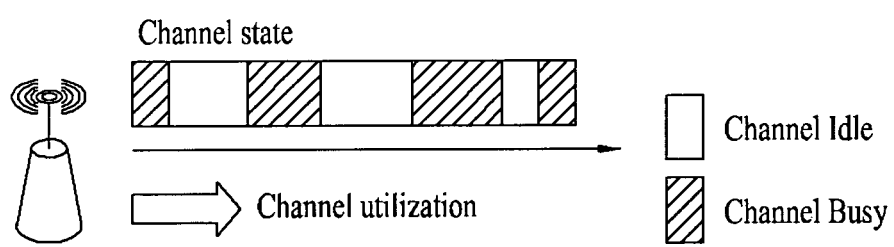

FIGS. 9 and 10 illustrate a method for processing traffic in a distributed manner using WLAN-enabled RSs according to an embodiment of the present invention.

The embodiment of the present invention is implemented on the assumption that a plurality of RSs are under control of a single BS, more or less near to one another in a cellular environment, as illustrated in FIG. 9.

It is assumed that each RS is connected to the BS by cable and to users in a wireless cellular fashion and is WLAN-enabled because it is equipped with a WLAN interface card. It is assumed that WLAN communication and cellular communication have a negligibly small influence on each other. As stated above, each RS has a WLAN card in the embodiment of the present invention. Implementation of the embodiment of the present invention may offer the benefits of decreased RS complexity and/or use of low-price WLAN cards. When its neighbor WLAN devices are not in communications, an RS may perform a variety of operations in WLAN. Since WLAN communications are made using independent cards, they may occur simultaneously with wired communications or wireless cellular communications.

WLAN is based on Carrier Sense Multiple Access with Collision Avoidance (CSMA/CA). CSMA/CA is an access control scheme used for WLAN, in which each terminal transmits data only after confirming that a communication line is kept clear for a predetermined time or longer because no collision (e.g. collision between signals on the same link) is detectable in WLAN. Therefore, a current channel status is known by Clear Channel Assessment (CCA) in WLAN. FIG. 10 illustrates an operation for monitoring channel status for channel utilization in an RS according to an embodiment of the present invention.

In the embodiment of the present invention, the RS calculates the ratio of a time during which other WLAN devices occupy a channel to a predetermined total time based on a channel monitoring result and estimates the channel status of WLAN based on the ratio. As a channel has a lower use rate, it is better and has a higher utility for cooperative communications between RSs according to the embodiment of the present invention. On the contrary, a channel with a higher use ratio has a lower utility for cooperative communications between RSs according to the embodiment of the present invention.

The distributed traffic processing based on a calculated traffic congestion level according to the embodiment of the present invention will be described below in great detail.

Figure 11:
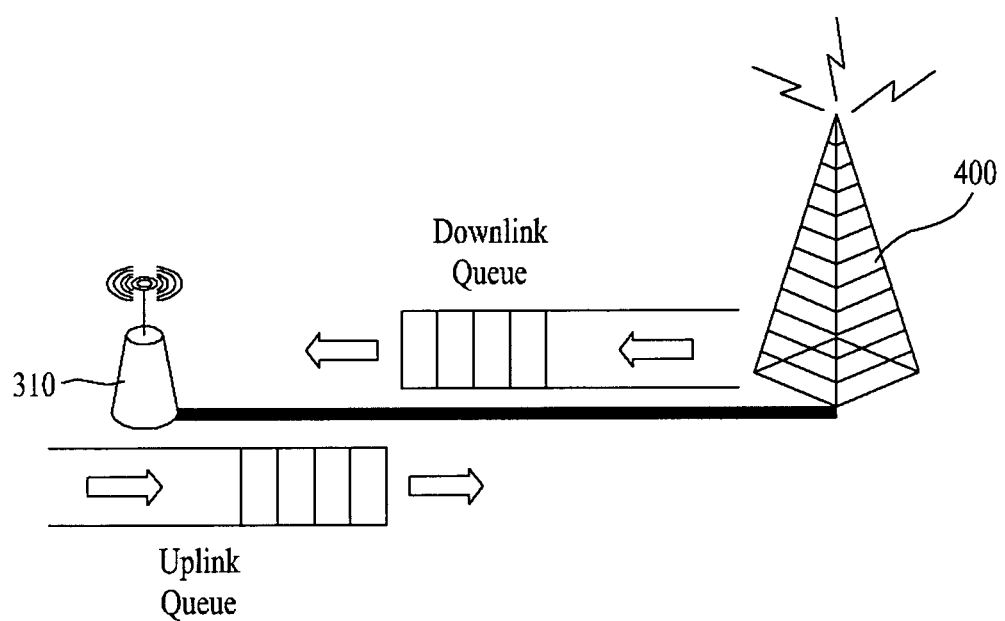
FIG. 11 illustrates a method for determining a traffic congestion level according to an embodiment of the present invention.

FIG. 11 illustrates a method for determining a traffic congestion level according to an embodiment of the present invention.

Referring to FIG. 11, the RS 310 transmits traffic received from a user to the BS 400 over a wired network. In the embodiment of the present invention, the RS 310 may determine the congestion level of the wired network based on a queue length of a link. That is, the RS 310 may determine the congestion level by calculating the amount of data buffered in a buffer before transmitting the received user traffic to the BS 400.

Figure 12:
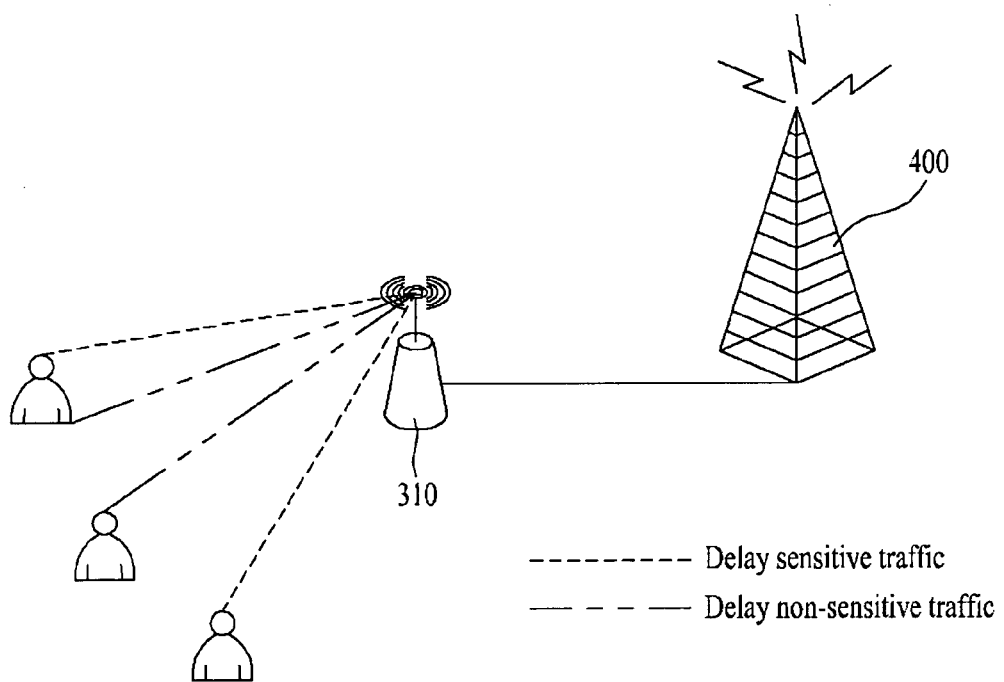
FIG. 12 illustrates selection of traffic to be transmitted to another RS, when an RS transmits part of user traffic to another RS, for distributed processing according an embodiment of the present invention.

Because more queued data leads to a long delay of user traffic, it may adversely affect users with delay-sensitive Quality of Service (QoS). An estimated delay time may be mathematically calculated based on a queue length by a queueing theory. It is preferable to get knowledge of a downlink queue length as well as an uplink queue length in order to accurately determine the characteristics of the wired network. To this end, the RS 310 preferably exchanges information about queue lengths continuously with the BS 400. FIG. 12 illustrates selection of traffic to be transmitted to another RS, when an RS transmits part of user traffic to another RS, for distributed processing according an embodiment of the present invention.

Referring to FIG. 12, the RS 310 preferably distinguishes user traffic according to their QoS requirements. That is, the RS 310 determines whether a user-required QoS can be satisfied at a current congestion level of the wired network and sets a criterion on whether to distribute user traffic to another RS based on the determination in the embodiment of the present invention.

As illustrated in FIG. 12, user traffic may be delay-sensitive or delay-tolerant. Although a decision as to whether to transmit traffic to a neighbor RS may be made according to the congestion level of the wired network and the delay sensitiveness of the traffic, it is preferred that the RS 310 distributes delay-tolerant traffic to the neighbor BS and transmits delay-sensitive traffic directly to the BS 400 over the wired network. The opposite case is also possible. That is, the RS 310 may distribute delay-sensitive traffic to the neighbor BS and transmits delay-tolerant traffic directly to the BS 400 over the wired network.

Now a description will be made of a method for detecting a helping RS for helping with traffic processing, when traffic is congested at a particular RS.

Figure 13:
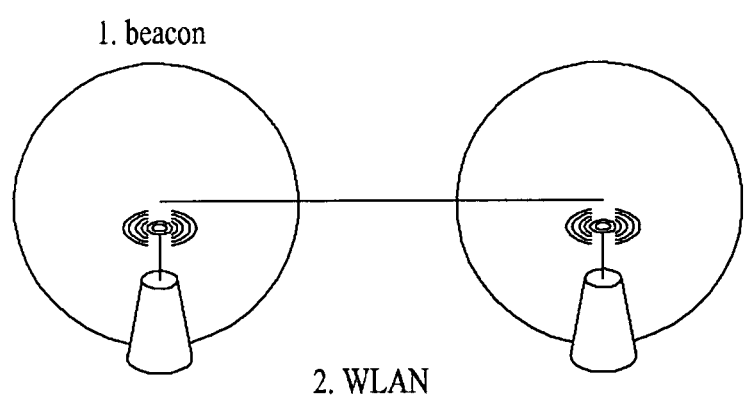
FIG. 13 illustrates a method for autonomously detecting a helping RS in an RS according to an embodiment of the present invention.

FIG. 13 illustrates a method for autonomously detecting a helping RS in an RS according to an embodiment of the present invention.

Referring to FIG. 13, each RS may broadcast a beacon message indicating its presence periodically, like a WLAN access point. Therefore, RSs may be aware that other RSs exist near to them by receiving beacon messages from the neighbor RSs in the embodiment of the present invention. When an RS needs to establish a WLAN path, it may connect to a neighbor BS as if it were a WLAN user, for communications.

The embodiment of the present invention is advantageous in that it is implementable simply by modifying RSs without the aid of another network and conducts communications, reflecting use statuses of neighbor WLAN devices. Further, the embodiment of the present invention shortens a time required to open a WLAN session. However, due to difficulty in acquiring traffic information about a helping RS, the detected helping RS may not be idle.

Figure 14:
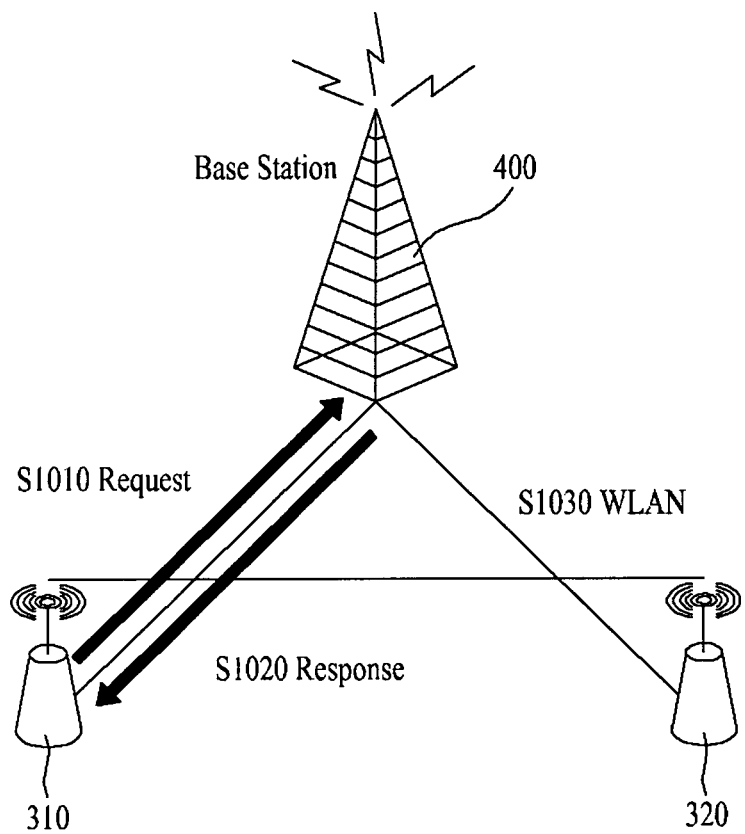
FIG. 14 illustrates a method for detecting a helping RS through a BS in an RS according to an embodiment of the present invention.

FIG. 14 illustrates a method for detecting a helping RS through a BS in an RS according to an embodiment of the present invention.

Referring to FIG. 14, when the RS 310 needs a helping RS, it requests information about a helping RS to the BS 400 in step S1010. The BS 400 may designate a most helpful RS 320 as the helping RS for the RS 310 using relay load information that the BS 400 preserves in step S1020. In step S1030, the RS 310 establishes a WLAN path with the RS 320.

Figure 15:
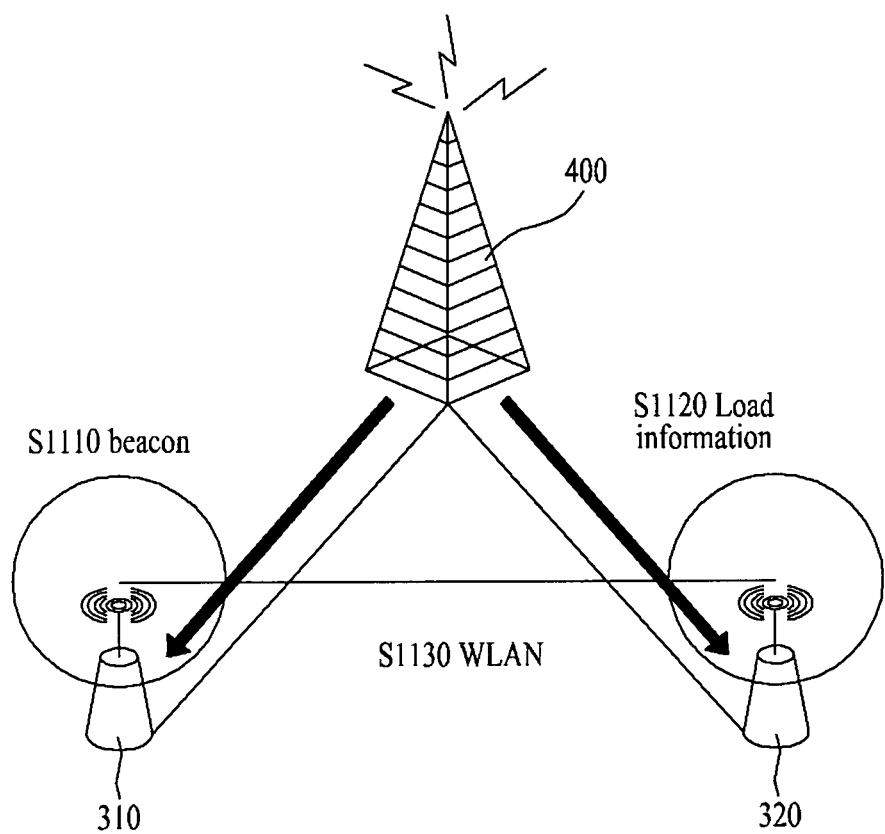
FIG. 15 illustrates a method for detecting a helping RS in an RS according to an embodiment of the present invention.

In the embodiment of the present invention, since the BS has accurate knowledge of the load status of each RS, it may designate an appropriate helping RS for each RS. Compared to the embodiment of the present invention illustrated in FIG. 13, there is no need for broadcasting a control message such as a beacon message. However, the BS should acquire and preserve information about the load status of each RS and the RS may not reflect a current WLAN channel status all the time. FIG. 15 illustrates a method for detecting a helping RS in an RS according to an embodiment of the present invention.

The embodiment of the present invention illustrated in FIG. 15 is a combination of the embodiments illustrated in FIGs. 13 and 14. Referring to FIG. 15, information about what RSs are around is known and preserved by exchanging beacon messages with RSs periodically in step S1110. Therefore, information about WLAN channels between each RS and particular RSs and existence of each RS are known periodically. In step S1120, the BS 400 periodically transmits load information about all RSs to each RS.

If the RS 310 searches for a WLAN path, it selects an RS that is not experiencing traffic congestion based on the load information about each RS received from the BS 400 and establishes a WLAN path with the selected RS in step S1130. Preferably, the RS 310 selects the RS 320 in good channel status from among neighbor RSs. That is, an RS may select an optimal helper, taking into account the load status of the helping RS and all WLAN channel statuses from the RS to the helping RS.

In accordance with the above-described embodiment of the present invention, cellular RSs are equipped with WLAN interface cards and when a specific RS is experiencing traffic congestion, traffic is distributed to another helping RS by WLAN communications. Therefore, load balancing is achieved. If traffic from users is distinguished according to the characteristics of the traffic and transmitted separately through a direct wired path to a BS and through a WLAN path to a neighbor RS, the delay or jitter QoS requirements of the user traffic may be satisfied better than in existing systems.

Embodiment 2: Using Control Channel

A method for distributing traffic in an unused frequency band according to an embodiment of the present invention will be described below.

Figure 16:
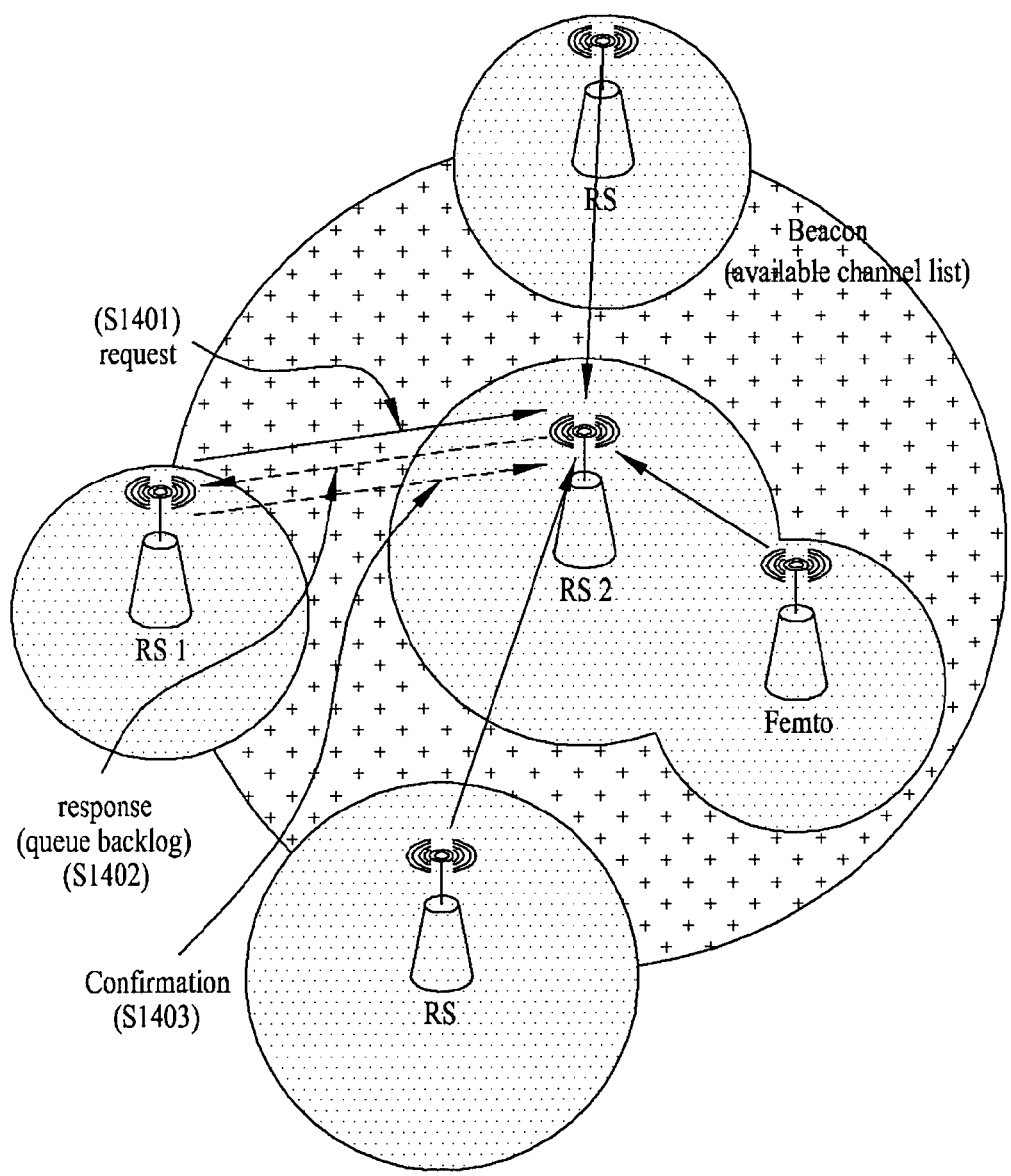
FIG. 16 illustrates a method for using a TV White Space (TVWS) band in an RS according to an embodiment of the present invention.

FIG. 16 illustrates a method for using a TVWS band in an RS according to an embodiment of the present invention.

The illustrated case of FIG. 16 is based on the assumption that a BS, RSs, and a plurality of terminals connected to the RSs are in communication, each RS is equipped with a conventional wireless communication module and a TVWS-based communication module. And a neighbor RS (RS2) is located within a coverage of the TVWS band of a first RS (RS1).

It may occur that traffic is congested at a specific RS, herein RS1. The traffic congestion may result when a few terminals connected to the specific RS request traffic exceeding the capacity of a relay link between the BS and the specific RS, or when so many terminals as to cause excess demands are connected to the specific RS. Due to the traffic congestion at the specific RS, it is difficult to support QoS traffic (audio, video, etc.) sensitive to delay or jitter. Even delay-tolerant data traffic is also delayed longer. Even though the RS adopts appropriate Call Admission Control (CAC), services cannot be provided to terminals that cause excess demands.

Accordingly, if a neighbor RS has a relatively low traffic load, the specific RS distributes its traffic load to the neighbor RS in a TVWS communication scheme, to thereby preventing system performance degradation in the embodiment of the present invention. Thus an RS may determine the congestion level of traffic received from terminals, distinguish the traffic according to the congestion level, and transmit part of the traffic to its neighbor RS. The neighbor RS may transmit the received traffic to a BS.

The RSs operate in the TVWS communication scheme for communications between them. Compared to a conventional communication scheme, the TVWS communication scheme has some advantages.

First of all, the influence of communications between RSs on communications between an RS and a terminal or between an RS and a BS is minimized. Since the TVWS communication scheme uses a frequency band independent of frequency bands used in the conventional communication scheme, a network formed with links between RSs may operate independently of a cellular network that operates in the conventional communication scheme. The use of a TVWS band increases the probability of discovering neighbor RSs because a signal is less attenuated for a given distance and has a higher transmittance in the TVWS band than in a GHz-band. Also, signal characteristics are good between an RS and a neighbor RS having the same distance and thus a relatively high data rate can be expected from a relay link.

The FCC regulates that an RS performs spectrum sensing periodically, when using a TVWS band. Although the spectrum sensing itself imposes overhead, the freedom of radio resource allocation increases in a spectrum considered unused. Accordingly, radio resources may be utilized flexibly.

A traffic distribution procedure between RS1 and RS2 will be described below with reference to FIG. 16.

After RS1 which intends to distribute traffic to a neighbor BS determines whether a TVWS control channel is kept idle for a predetermined time (e.g. DIFS-11 spec), it may wait for a random backoff time. If the TVWS control channel is still idle after the random backoff time, RS1 broadcasts a help request message on the TVWS control channel, preferably along with its congestion level, that is, information about a queue length in step S1401. The help request message may correspond to a random access preamble used in a random access procedure.

Upon receipt of the help request message, RS2 within the coverage of the TVWS control channel determines whether it can serve as a helper, taking into account a link gain estimated from the help request message and its load. If RS2 determines that it can serve as a helper for RS1, RS2 may transmit a help response message to RS1 after a random backoff time in step S1402. The help response message may include an available channel list.

Upon receipt of the help response message from RS2, RS1 may establish a link with RS2 by broadcasting a confirmation message or transmitting the confirmation message to RS2 in step S1403. In this manner, RS1 and RS2 may establish the link by 3-way handshake. The confirmation message may indicate a channel to be used via the link between RS1 and RS2 and a use time of the channel, so that neighbor RSs may be aware of the channel and its use time.

In the embodiment of the present invention, if RS1 fails to receive the help response message for the help request message from RS2, it may repeatedly transmit the help request message a predetermined number of times because there is no way to identify whether the reception failure is caused by message collision or the absence of any neighbor RS. The backoff times that RS1 and RS2 wait before transmitting the help request message and the help response message may vary according to the RS congestion level.

In accordance with the embodiment of the present invention, as an RS requesting help has a longer queue length, that is, it suffers from overload, a backoff time is set to be shorter. Also, if a helping RS has a shorter queue length, that is, its relay link is not congested less, a backoff time is set to be shorter. When a relay link is to be established between RSs in an environment densely populated with RSs such as femtocell BSs, the above-described backoff time setting facilitates setup of a link between an RS suffering from the largest load and an RS with the least load. Preferably, a backoff time is determined for each RS in a distributed manner. When a random backoff time is used, it may be selected according to a contention window in the same manner as done in a conventional WLAN. In the case where a backoff time is adjusted according to a congestion level, the maximum value of the contention window may be controlled or a static value may be calculated as a backoff time according to a queue length.

Embodiment 3: Using TVWS Database

A description will be made of a method for acquiring information about a neighbor intermediate access point using a TVWS database and distributing traffic to the neighbor intermediate access point.

Figure 17:
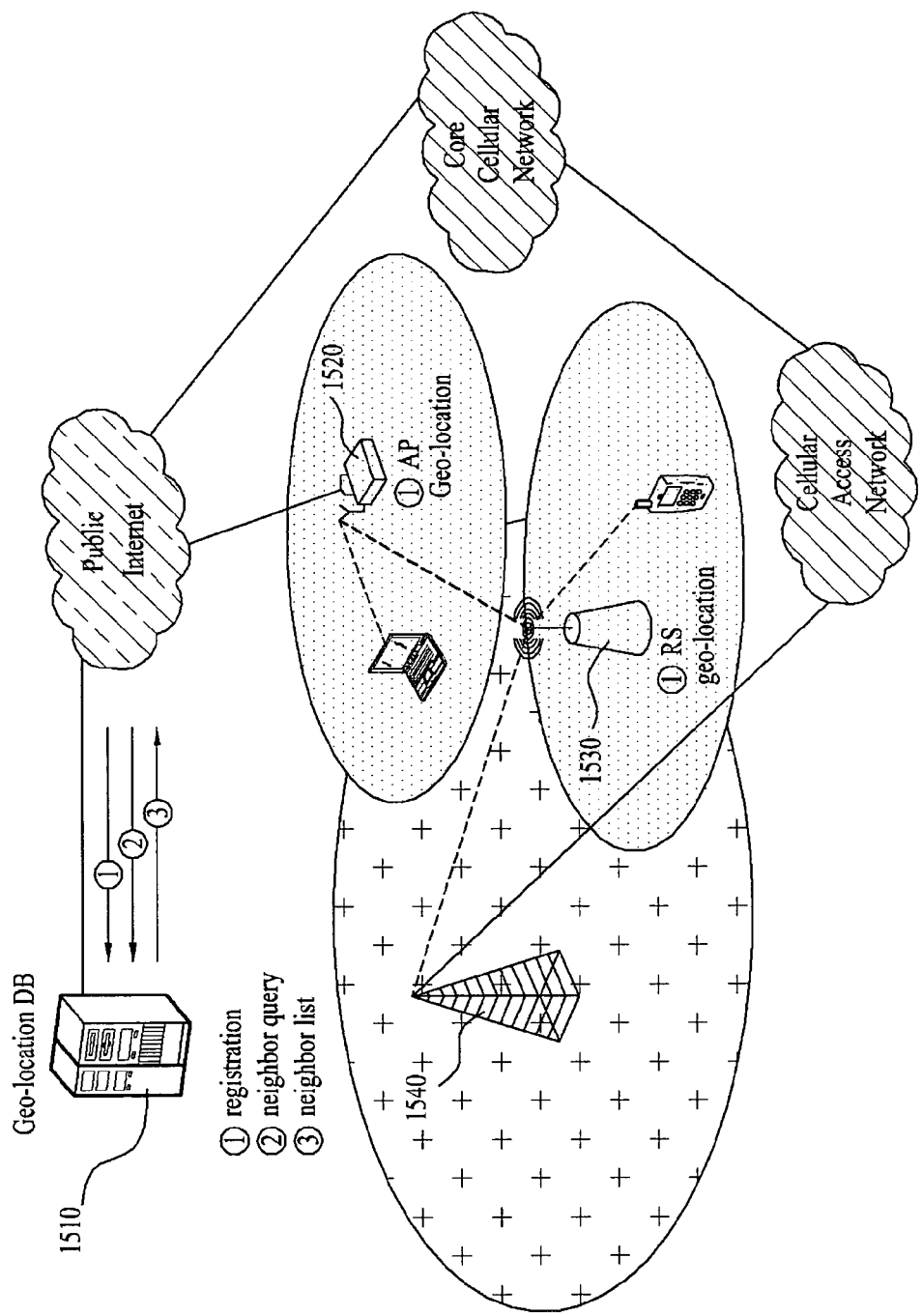
FIG. 17 illustrates a method for establishing a connection with a neighbor intermediate access point using a TVWS database and distributing traffic to the neighbor intermediate access point according to an embodiment of the present invention.

FIG. 17 illustrates a method for establishing a connection with a neighbor intermediate access point using a TVWS database and distributing traffic to the neighbor intermediate access point according to an embodiment of the present invention.

In FIG. 17, a geographical location database (geo-location DB) 1510 is given as an example of a TVWS database. An Access Point (AP) 1520 and an RS 1530 are intermediate access points. The AP 1520 may access the geo-location DB 1510 over a public Internet, whereas the RS 1530 may access the geo-location DB 1510 over a cellular access network, a core cellular network, and the public Internet. However, system implementation is not limited to this specific configuration. In accordance with the embodiment of the present invention, the intermediate access points 1520 and 1530 initially register their locations to the TVWS DB 1510. The TVWS DB 1510 may tabulate the locations of such intermediate access points and store the list. An intermediate access point may query the TVWS DB 1510 about neighbor intermediate access points, receive a neighbor intermediate access point list as a response, and select a neighbor intermediate access point to which the intermediate access point will request help in relation to traffic distribution, from the received neighbor intermediate access point list.

When requesting queue length information to candidate neighbor RSs, the RS 1530 preferably requests available channel lists to them, as well. Upon receipt of the queue length information request, a target RS may reply to the RS 1530 with queue length information and an available channel list acquired by sensing and access to the TVWS DB 1510. The RS 1530 may measure the channel states of channels included in the available channel list of the target RS and select the best channel. That is, the RS 1530 may select an RS to which the RS 1530 will transmit traffic and a channel to carry the traffic through a link between the RS 1530 and the RS, taking into account queue length information received from each candidate neighbor RS and the best channel between the RS 1530 and each candidate neighbor RS.

RSs operating in the TVWS communication scheme may broadcast beacon messages in the 900 MHz Industry, Science and Medicine (ISM) band close to a TV band in the same manner as done in WLAN. Upon receipt of the beacon messages, RSs may discover their neighbor RSs and request or transmit necessary information (queue length information, available channel information, etc.). The RS can acquire the neighboring RS list information from the above stated beacon. However, the RS can acquire the neighboring RS list information from TVWS database, therefore beacon transmission is not necessary for acquiring the neighboring RS list information.

For example, if RSs are limited to cellular RSs, an RS that intends to acquire a neighbor RS list, that is, an RS that wants to distribute traffic to a neighbor RS may transmit a message requesting the neighbor RS list to a BS in a cellular communication scheme. Upon receipt of the neighbor RS list request, the BS may request RS lists to neighbor BSs and acquire the RS lists from the neighbor BSs. The BS then transmits the received RS lists and its RS list to the RS. Even in an environment populated with heterogeneous RSs as illustrated in FIG. 15, the use of a TVWS DB facilitates acquisition of an accurate neighbor RS list. The FCC regulates that fixed devices operating as unauthorized users in a TV band, such as APs or RSs, register their locations (latitudes and longitudes) to a DB. Therefore, when an RS that has registered its location to the TVWS DB 1510 in FIG. 17 wants to acquire a neighbor RS list, the RS may access the TVWS DB 1510 and request the neighbor RS list to the TVWS DB 1510. The TVWS DB 1510 may notify the RS of a list of TVWS RSs registered as located within the coverage radius of the TV band, referring to the registered geographical location of the requesting RS, or of specific candidate RSs nearest to the requesting RS. This service is expected to offer added values to DB service provides. After acquiring the neighbor RS list, the RS may transmit a message requesting queue length information to neighbor RSs on a control channel of for example, 900 MHz in the CSMA/CA manner and acquire necessary information from the queue length information received from the neighbor RSs.

Even though not using a dedicated control channel, such as 900 MHz band, when additional function is added to the DB, the RS can transmit or receive control message using an unused channel within the TV band. One specific embodiment of the present invention proposes a TVWS DS having not only geographical location information of the secondary user (RSs) but also available channel list at their locations. In this embodiment, when a specific RS queries the neighbor list to the DB, the DB compares the available channel lists of the specific RS and the neighboring RS located within the transmission coverage of the specific RS, and assigns the control channel among the commonly available channel of the specific RS and the neighboring RSs. Each of the neighboring RSs wait in a receiving mode for the assigned control channel, and specific RS can acquires traffic load, available channel information, etc, or measures link gain. Then, if necessary, the specific RS can perform new negotiation for a channel to be used for data communication, and the specific RS also can use the assigned control channel at transmitting data.

Now a description will be made of an intermediate access point apparatus for implementing the above-described embodiments of the present invention.

Figure 18:
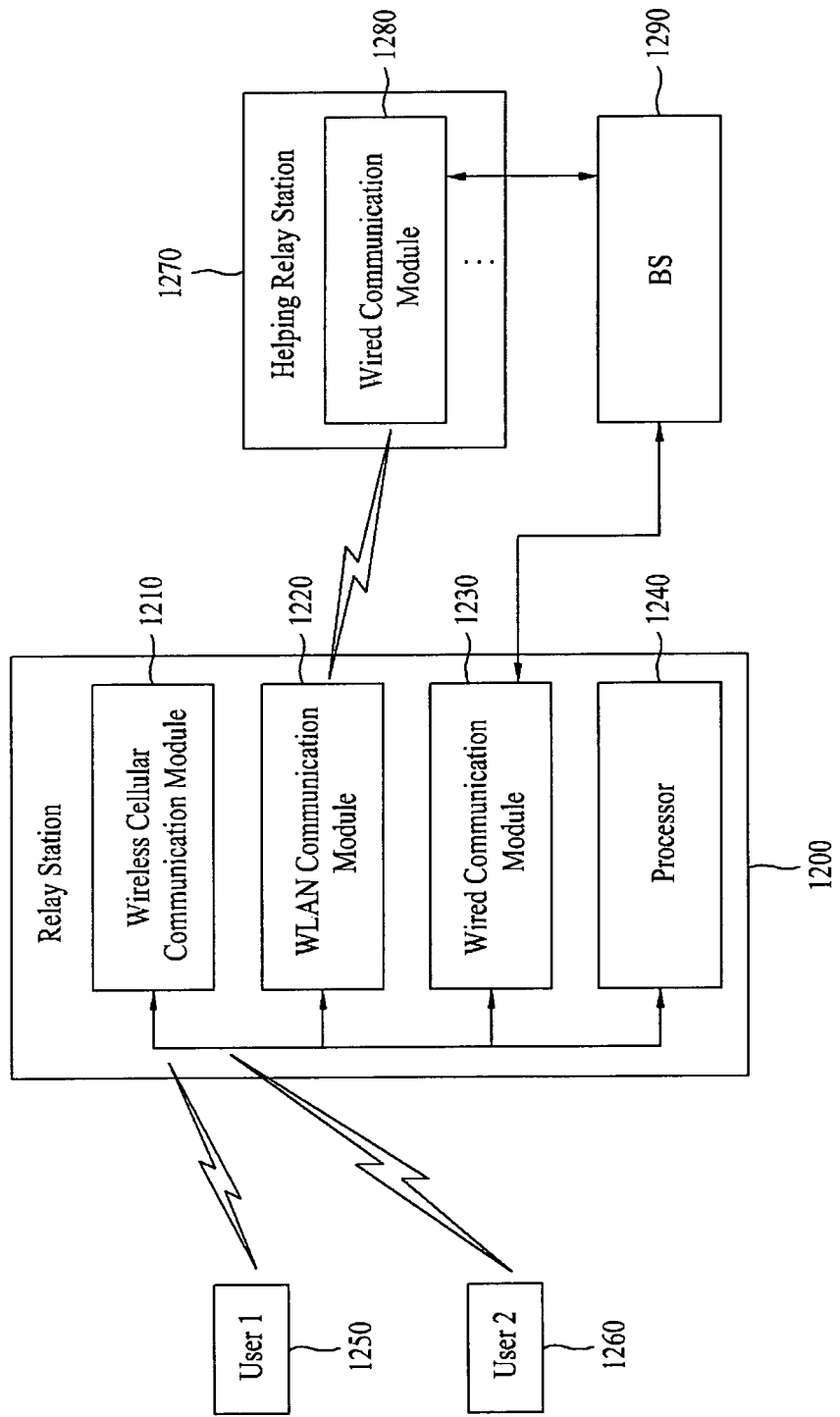
FIG. 18 is a block diagram of an RS according to an embodiment of the present invention.

FIG. 18 is a block diagram of an RS according to an embodiment of the present invention.

Referring to FIG. 18, an RS 1200 according to the embodiment of the present invention includes a wireless cellular communication module 1210 for receiving traffic from one or more users 1250 and 1260 by cellular communications, a WLAN communication module 1220 for establishing a WLAN path with another RS 1270 and transmitting the received traffic to the RS 1270 through the WLAN path, a wired communication module 1230 for communicating with a BS 1290 via a wired connection, and a processor 1240 for controlling the communication modules 1210, 1220 and 1230. Depending on implementations, the WLAN communication module 1220 for communicating with the RS 1270 for traffic distribution may be replaced by a communication module using an unused frequency band (e.g. a TVWS band).

In accordance with the embodiment of the present invention, the processor 1240 measures the congestion level of the traffic that the wireless cellular communication module 1210 has received from the users 1250 and 1260. If the congestion level is a predetermined value or higher, the processor 1240 transmits part of the received traffic, preferably relatively delay-tolerant traffic to the RS 1270 as a helping RS through the WLAN communication module 1220 so that the helping RS 1270 transmits the received traffic to the BS 1290 through its wired communication module 1280. The processor 1240 also controls traffic other than the traffic transmitted to the helping RS 1270 to be transmitted to the BS 1290 through the wired communication module 1230.

In accordance with the afore-described embodiment using a TVWS DB, the processor 1240 may be adapted to acquire information about neighbor intermediate access points to communicate with in a TVWS band from the TVWS DB and select the intermediate access point 1270 based on the acquired information.

The processor 1240 may also be adapted to transmit a request message including an available channel list that lists channels available to a specific communication module (obtained by adding or replacing a function in the WLAN communication module 1220) in the TVWS band to the neighbor intermediate access points indicated by the acquired information through the specific communication module, receive response messages for each channel included in the available channel list from the neighbor intermediate access points, and select the intermediate access point 1270 that will help the RS with traffic distribution from among the neighbor intermediate access points based on the response messages.

In accordance with Embodiment 2, the processor 1240 may manage random access backoff time values for use in connecting to the intermediate access point 1270. Specifically, if a queue length is longer from a standpoint of a requesting intermediate access point, the processor 1240 may set a backoff time used for transmission of a help request message to be shorter. If a queue length is shorter from a standpoint of a helping intermediate access point, the processor 1240 may set a backoff time used for transmission of a help response message to be shorter.

While the above embodiments of the present invention have been described in the context of an intermediate access point being an RS between a BS and a terminal, the intermediate access point may be any other type such as a femtocell BS, a picocell BS, etc.

As is apparent from the above description, according to the embodiments of the present invention, in spite of traffic between a BS and terminals congested at a particular intermediate access point, the traffic is efficiently processed without a long time delay. When a path is established, taking into account the characteristics of the traffic, communication quality is further improved.

Compared to an inter-Radio Access Technology (RAT) handover technology in which inter-RAT handover occurs in case of traffic congestion, the embodiments of the present invention save the time taken for a terminal's inter-RAT handover, minimize system modification, and efficiently process traffic. In addition, when the traffic is distributed in an unused frequency band (e.g. a TVWS band), the traffic distribution can be efficiently performed across a large coverage area without interfering with conventional communications.

The traffic processing methods according to the above-described embodiments of the present invention are applicable to a variety of communication systems using RSs or their equivalent intermediate access points, such as 3GPP LTE, 3GPP LTE-A, systems based on the family of IEEE 802 standards, etc. The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

What is claimed is:

1. A method for processing traffic directed from one or more terminals to a Base Station (BS) by a first intermediate access point supporting two or more communication schemes, the method comprising:
   receiving traffic from the one or more terminals by the first intermediate access point according to a first communication scheme;
   measuring a congestion level of the received traffic by the first intermediate access point;
   transmitting a first traffic being part of the received traffic from the first intermediate access point to a second intermediate access point according to a second communication scheme different from the first communication scheme, if the congestion level is equal to or higher than a predetermined threshold; and
   transmitting a second traffic being remaining traffic of the received traffic except the first traffic from the first intermediate access point to the BS, wherein the second communication scheme is a communication scheme using a frequency band unused for another communication system.

2. The method according to claim 1, wherein the frequency band unused for another communication system includes a TV White Space (TVWS).

3. The method according to claim 2, further comprising:
   acquiring information about neighbor intermediate access points available in the TVWS from a TVWS database; and
   selecting the second intermediate access point based on the acquired information.

4. The method according to claim 3, wherein the second intermediate access point selection comprises:
   transmitting, to the neighbor intermediate access points according to the acquired information, a request message including an available channel list that is a list of channels available to the first intermediate access point according to the second communication scheme;
   receiving response messages for each channel included in the available channel list from the neighbor intermediate access points; and
   selecting the second intermediate access point from among the neighbor intermediate access points based on the response messages.

5. The method according to claim 2, further comprising:
   monitoring a control channel in the TVWS and transmitting a random access preamble to the second intermediate access point after a predetermined backoff time;
   receiving a response message for the random access preamble from the second intermediate access point; and
   establishing a connection with the second intermediate access point according to the response message.

6. The method according to claim 5, wherein the predetermined backoff time is determined according to a traffic congestion level of the first intermediate access point.

7. The method according to claim 1, wherein the second communication scheme is a Wireless Local Area Network (WLAN) communication scheme.

8. The method according to claim 1, wherein the first and second communication schemes are independent of each other.

9. A first intermediate access point device supporting two or more communication schemes, the first intermediate access point device comprising:
   a first communication module for receiving traffic from one or more terminals according to a first communication scheme;
   a second communication module for transmitting traffic to a second intermediate access point according to a second communication scheme different from the first communication scheme;
   a third communication module for transmitting traffic to a Base Station (BS) according to a third communication scheme different from the first communication scheme and the second communication scheme; and
   a processor for measuring a congestion level of the traffic received at the first communication module, transmitting a first traffic being part of the traffic received at the first communication module to the second intermediate access point through the second communication module, if the congestion level is equal to or higher than a predetermined threshold, and transmitting a second traffic being remaining traffic of the traffic received at the first communication module except the first traffic the BS, wherein the second communication scheme is a communication scheme using a frequency band unused for another communication system.

10. The first intermediate access point device according to claim 9, wherein the frequency band unused for another communication system includes a TV White Space (TVWS).

11. The first intermediate access point device according to claim 10, wherein the processor is adapted to acquire information about neighbor intermediate access points available in the TVWS from a TVWS database and to select the second intermediate access point based on the acquired information.

12. The first intermediate access point device according to claim 11, wherein the processor is adapted to transmit, to the neighbor intermediate access points according to the acquired information, a request message including an available channel list that is a list of channels available to the second communication module, to receive response messages for each channel included in the available channel list from the neighbor intermediate access points, and to select the second intermediate access point from among the neighbor intermediate access points based on the response messages.

13. The first intermediate access point device according to claim 10, wherein the processor is adapted to monitor a control channel in the TVWS and transmit a random access preamble to the second intermediate access point after a predetermined backoff time, to receive a response message for the random access preamble from the second intermediate access point, and to establish a connection with the second intermediate access point according to the response message.

14. The first intermediate access point device according to claim 13, wherein the predetermined backoff time is determined according to a traffic congestion level of the first intermediate access point.

15. The first intermediate access point device according to claim 9, wherein the first communication module includes a cellular communication module and the second communication module includes a Wireless Local Area Network (WLAN) communication scheme.

16. The first intermediate access point device according to claim 9, wherein the first intermediate access point includes a relay station and the third communication module includes a wired communication module using a wired network connected between the relay station and the BS.

* * * * *